United States Patent
Wang He

(10) Patent No.: US 8,911,135 B2
(45) Date of Patent: Dec. 16, 2014

(54) LIGHT GUIDE PLATE HAVING UNIFORM LIGHT EMISSION AND BACKLIGHT MODULE INCLUDING SAME

(75) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/556,223

(22) Filed: Jul. 24, 2012

(65) Prior Publication Data
US 2013/0223099 A1    Aug. 29, 2013

(30) Foreign Application Priority Data
Feb. 29, 2012   (TW) .............................. 101106619 A

(51) Int. Cl.
*F21V 8/00*   (2006.01)
(52) U.S. Cl.
USPC ............................ 362/621; 362/615; 362/619
(58) Field of Classification Search
CPC .......... F21V 8/00; G02B 6/00; G02F 1/13357
USPC ........................................ 362/615, 619, 625
See application file for complete search history.

(56) References Cited

U.S. PATENT DOCUMENTS

| | | | |
|---|---|---|---|
| 2008/0123366 A1* | 5/2008 | Yang et al. | 362/625 |
| 2010/0142224 A1* | 6/2010 | Zhang et al. | 362/615 |
| 2011/0194308 A1* | 8/2011 | Lin | 362/612 |
| 2013/0148378 A1* | 6/2013 | Mi et al. | 362/606 |

* cited by examiner

*Primary Examiner* — Stephen F Husar
*Assistant Examiner* — James Cranson, Jr.
(74) *Attorney, Agent, or Firm* — Novak Druce Connolly Bove + Quigg LLP

(57) ABSTRACT

A light guide plate includes a light incident surface, a bottom plate, a light emitting surface opposite to the bottom plate, and a side surface opposite to the light incident surface. The light incident surface is perpendicular to the light emitting surface. The bottom surface is imaginarily divided into rectangular sub-portions which are equal in area and shape. A portion of the sub-portions close to the side surface constitutes a main portion. Each sub-portion uniformly distributes micro protrusions. Along a direction from the light incident surface to the side surface, the micro protrusion densities of the sub-portions of the main portion gradually ascend, and the difference values of the micro protrusion densities of any two adjacent sub-portions of the main portion gradually ascend.

10 Claims, 6 Drawing Sheets

LIGHT GUIDE PLATE HAVING UNIFORM LIGHT EMISSION AND BACKLIGHT MODULE INCLUDING SAME

BACKGROUND

1. Technical Field

The present disclosure relates to a light guide plate and a backlight module including the light guide plate.

2. Description of Related Art

Light guide plates are often used to expand a number of point light sources to an area light source. A light guide plate includes a light emitting surface, a light incident surface perpendicular to the light emitting surface, a bottom surface opposite to the light emitting surface, and a side surface opposite to the light incident surface. The light source is positioned on one side of the light incident surface. Because there is a long distance between the light incident surface and the side surface, the light rays from the light sources will be reduced or lost during transmission, therefore, the brightness of an end of the light emitting surface away from the light incident surface is less than the brightness of the other end of the light emitting surface close to the light incident surface. That is, the brightness of the light emitting surface overall is not uniform.

Therefore, it is desirable to provide a light guide plate and a backlight module including the light guide plate that can overcome the above-mentioned limitations.

BRIEF DESCRIPTION OF THE DRAWINGS

Many aspects of the embodiments will be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
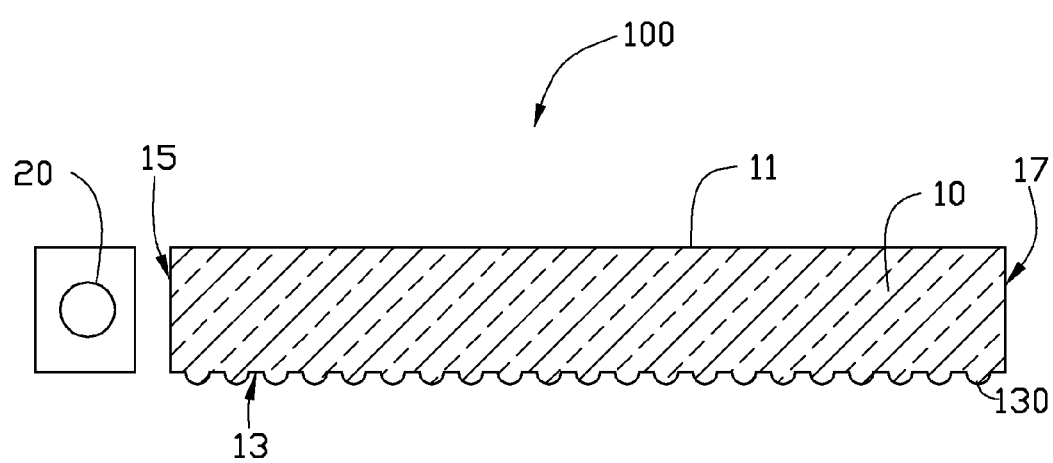
FIG. 1 is a schematic view of a backlight module, according to an exemplary embodiment, the backlight module including a light guide plate.

Referring to FIG. 1, a backlight module 100, according to an embodiment, includes a light guide plate 10 and a light source device 20. The light source device 20 may include a number of point light sources.

The light guide plate 10 is substantially rectangular and is made of transparent material (such as acrylic resin or polyethylene resin). The light guide plate 10 includes a top light emitting surface 11, a bottom surface 13, a light incident surface 15, and a side surface 17. The bottom surface 13 is opposite to the light emitting surface 11, and is parallel to the light emitting surface 11. The light incident surface 15 is connected to the light emitting surface 11 and the bottom surface 13. The light incident surface 15 is perpendicular to the light emitting surface 11. The side surface 17 is connected to the light emitting surface 11 and the bottom surface 17, and faces the light incident surface 15. In other embodiments, the bottom surface 13 can be inclined with respect to the light emitting surface 11.

The light source device 20 shines onto the light incident surface 15. The light incident surface 15 receives light rays from the light source device 20 and allows them to pass into the light guide plate 10. The bottom surface 13 and the side surface 17 internally reflect the light rays in the light guide plate 10. The light emitting surface 11 transmits a portion of the light rays incident thereon to the exterior above the light guide plate 10, and reflects the other portion of the light rays incident thereon back into the light guide plate 10.

Figure 2:
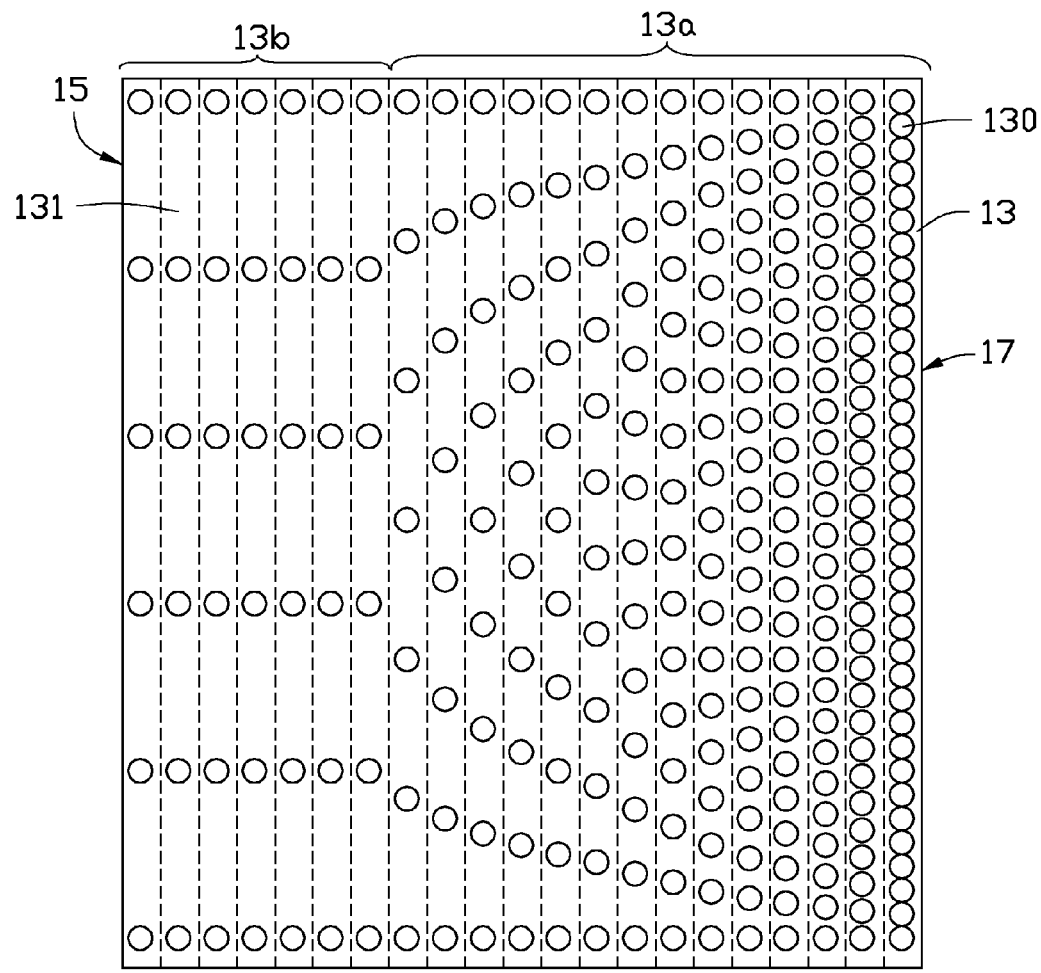
FIG. 2 is a schematic bottom view of the light guide plate of FIG. 1, the light guide plate including micro protrusions.

Also referring to FIG. 2, the bottom surface 13 is imaginarily divided into a number of rectangular sub-portions 131. The sub-portions 131 are continuously and uniformly distributed. The sub-portions 131 close to the side surface 17 are designated as a first main portion 13a. The sub-portions 131 close to the light incident surface 15 are designated as a second main portion 13b. The shapes and the area of the sub-portions 131 are the same as each other respectively. The long side of each sub-portion 131 is parallel to the light incident surface 15. Each of the sub-portions 131 uniformly distributes a number of micro protrusions 130. The shapes of the micro protrusions 130 are the same as each other. Each of the micro protrusions 130 can be semi-spherical, columnar, or rectangular.

Along a direction from the light incident surface 15 to the side surface 17, the micro protrusion densities of the sub-portions 131 of the first main portion 13a gradually ascend, and the difference values of the micro protrusion densities of adjacent sub-portions 131 of the first main portion 13a also gradually ascend. The micro protrusion densities of the sub-portions 131 of the second main portion 13b are constant, and this constant value is less than the micro protrusion densities of the sub-portions 131 of the first main portion 13a. In other embodiments, the second main portion 13b can be omitted.

Table 1 shows the micro protrusion densities of the sub-portions 131. Table 2 shows the difference values of the micro protrusion densities of adjacent sub-portions 131. In this embodiment, the number of the sub-portions 131 is twenty-one, and the sub-portions 131 from the light incident surface 15 to the side surface 17 are sequentially numbered 1~21. The first to the seventh sub-portions 131 are designated as the second main portion 13b. The eighth to the twenty-first sub-portions 131 are designated as the first main portion 13a. The number of the sub-portions 131 is not limited to this embodiment. Both of the units of the micro protrusion density and the difference value of micro protrusion densities are quantity per square millimeter.

TABLE 1

| Sub-portion number | 21 | 20 | 19 | 18 | 17 | 16 | 15 |
|---|---|---|---|---|---|---|---|
| Micro protrusion density | 36 | 28 | 21.5 | 16.8 | 13.7 | 11.5 | 10.1 |
| Sub-portion number | 14 | 13 | 12 | 11 | 10 | 9 | 8 |
| Micro protrusion density | 9 | 8.3 | 7.7 | 7.3 | 7.1 | 6.9 | 6.8 |
| Sub-portion number | 7 | 6 | 5 | 4 | 3 | 2 | 1 |
| Micro protrusion density | 6.7 | 6.7 | 6.7 | 6.7 | 6.7 | 6.7 | 6.7 |

TABLE 2

| Sub-portion number | 21→20 | 20→19 | 19→18 | 18→17 | 17→16 |
|---|---|---|---|---|---|
| Difference value of micro protrusion densities of adjacent sub-portions | 8 | 6.5 | 4.7 | 3.1 | 2.2 |
| Sub-portion number | 16→15 | 15→14 | 14→13 | 13→12 | 12→11 |
| Difference value of micro protrusion densities of adjacent sub-portions | 1.4 | 1.1 | 0.7 | 0.6 | 0.4 |
| Sub-portion number | 11→10 | 10→9 | 9→8 | 8→7 | 7→6 |
| Difference value of micro protrusion densities of adjacent sub-portions | 0.2 | 0.2 | 0.1 | 0.1 | 0 |
| Sub-portion number | 6→5 | 5→4 | 4→3 | 3→2 | 2→1 |
| Difference value of micro protrusion densities of adjacent sub-portions | 0 | 0 | 0 | 0 | 0 |

Figure 3:
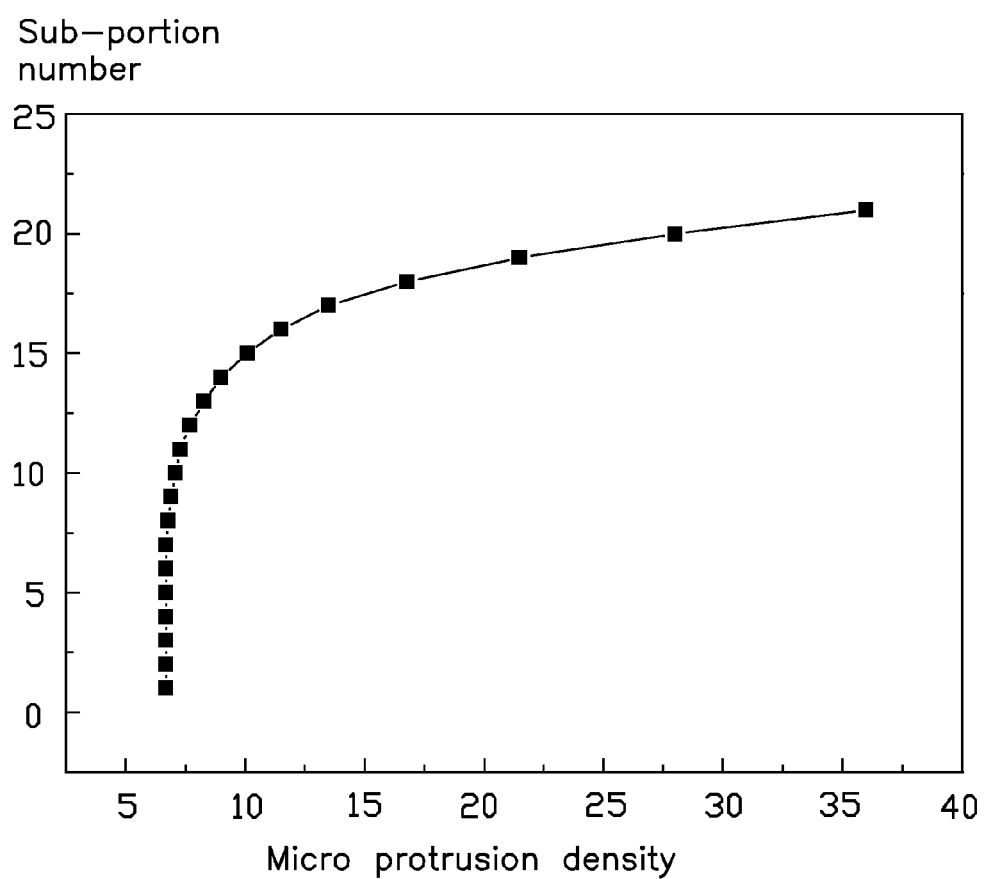
FIG. 3 is a chart showing the micro protrusion densities of the light guide plate of FIG. 2.
Figure 4:
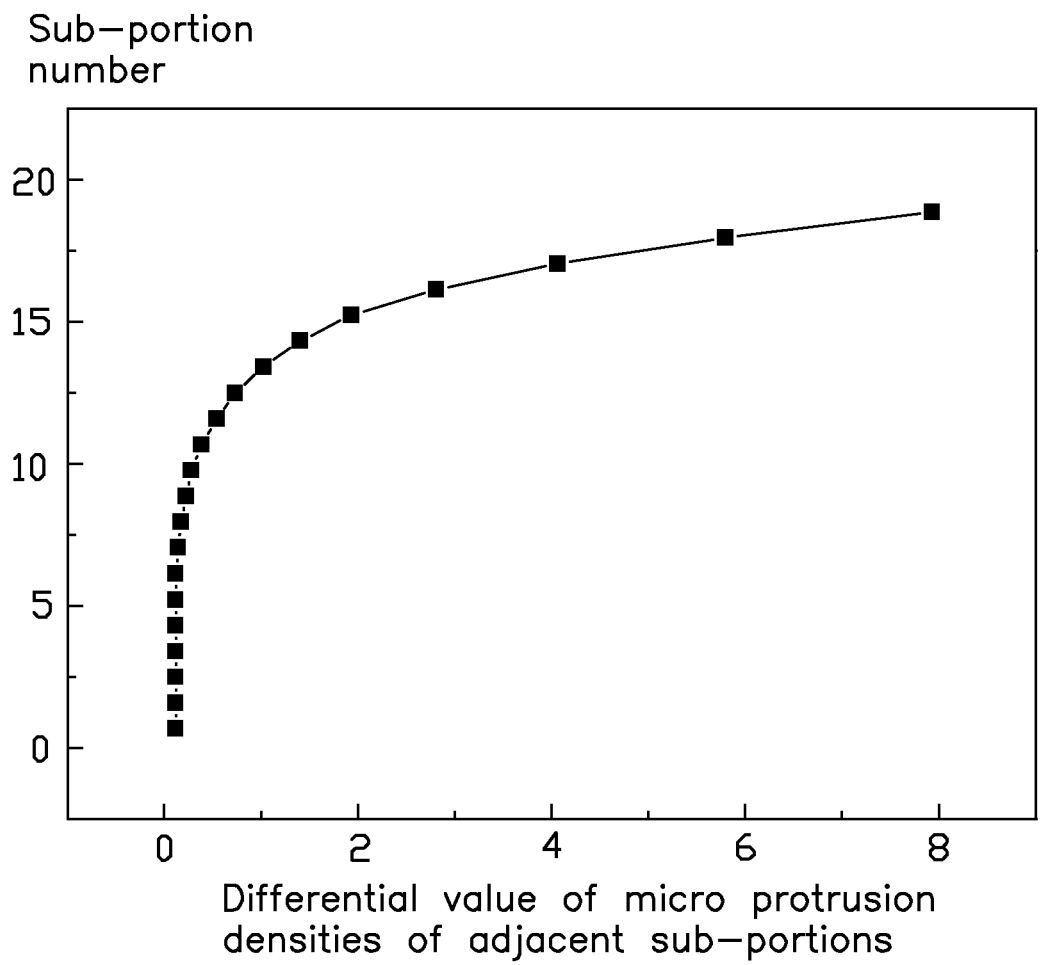
FIG. 4 is a chart showing the difference values of micro protrusion densities of adjacent sub-portions of the light guide plate of FIG. 2.

Referring to FIG. 3, a first coordinate is formed with the micro protrusion density as an abscissa, and the sub-portion number as an ordinate. Referring to FIG. 4, a second coordinate is formed with the difference value of the micro protrusion densities of adjacent sub-portions as an abscissa, and the sub-portion number as an ordinate. The data of table 1 shows a first curve in the first coordinate; the data of table 2 shows a second curve in the second coordinate. Both of the first curve and the second curve gradually ascend. Tests make it clear that the brightness of the first main portion 13a is improved to be substantially equal to the brightness of the second main portion 13b, therefore, the brightness overall of the light emitting surface 11 is uniform.

Figure 5:
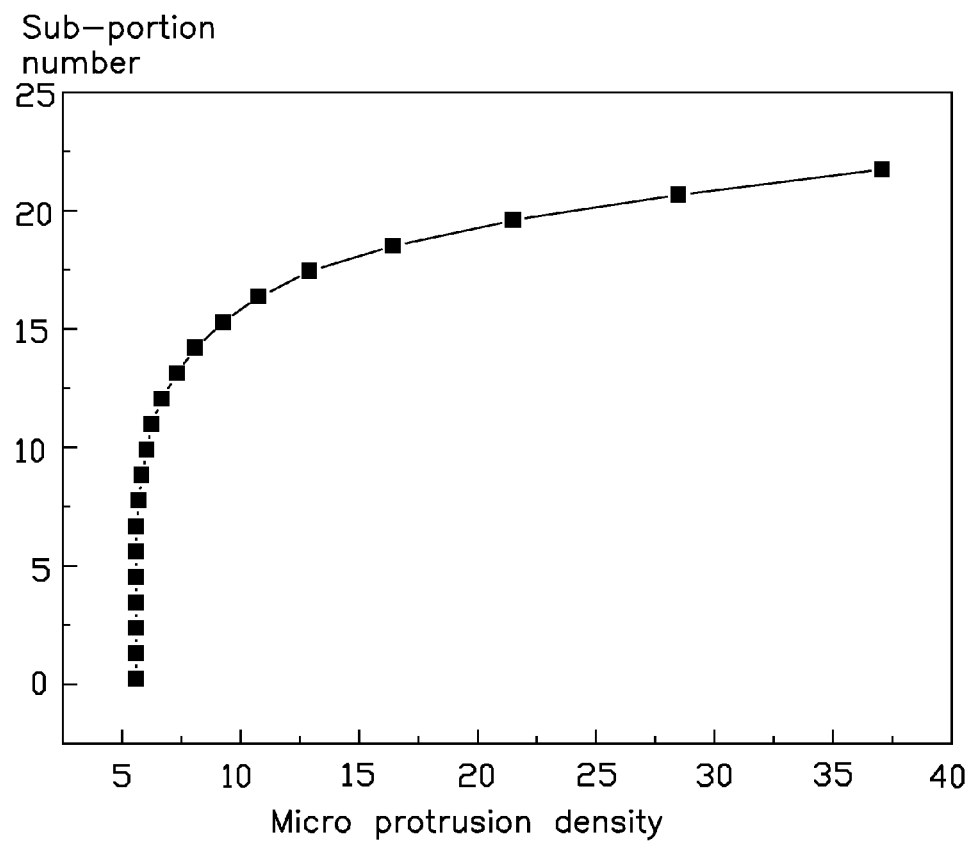
FIG. 5 is a chart showing the micro protrusion densities of the light guide plate, when the difference values of the micro protrusion densities of adjacent sub-portions do not gradually ascend.
Figure 6:
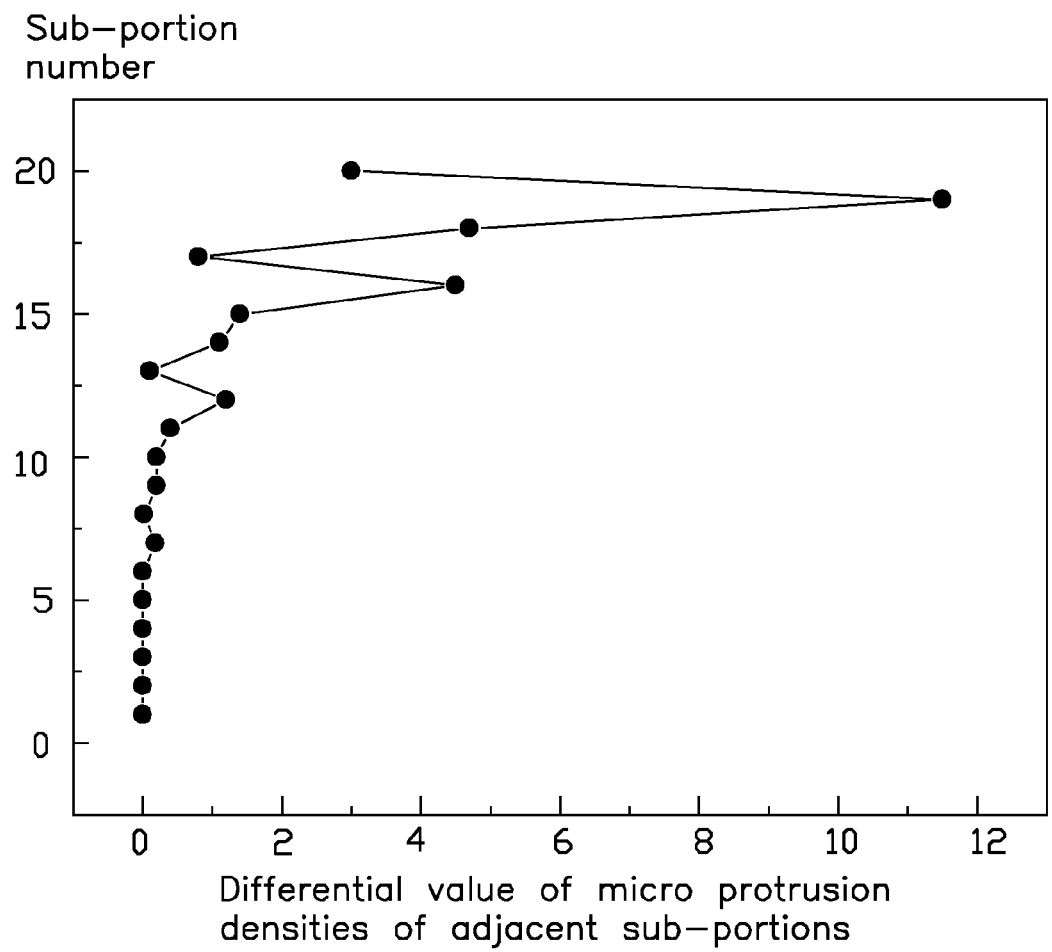
FIG. 6 is a chart showing the difference values of micro protrusion densities of adjacent sub-portions, when the difference values of the micro protrusion densities of adjacent sub-portions do not gradually ascend.

Referring to tables 3 and 4 and FIGS. 5 and 6, along the direction from the light incident surface 15 to the side surface 17, the micro protrusion densities gradually ascend, but the difference values of the micro protrusion densities of adjacent sub-portions 131 does not gradually ascend.

TABLE 3

| Sub-portion number | 21 | 20 | 19 | 18 | 17 | 16 | 15 |
|---|---|---|---|---|---|---|---|
| Micro protrusion density | 36 | 33 | 21.5 | 16.8 | 16 | 11.5 | 10.1 |
| Sub-portion number | 14 | 13 | 12 | 11 | 10 | 9 | 8 |
| Micro protrusion density | 9 | 8.9 | 7.7 | 7.3 | 7.1 | 6.9 | 6.88 |
| Sub-portion number | 7 | 6 | 5 | 4 | 3 | 2 | 1 |
| Micro protrusion density | 6.7 | 6.7 | 6.7 | 6.7 | 6.7 | 6.7 | 6.7 |

TABLE 4

| Sub-portion number | 21→20 | 20→19 | 19→18 | 18→17 | 17→16 |
|---|---|---|---|---|---|
| Difference value of micro protrusion densities of adjacent sub-portions | 3 | 11.5 | 4.7 | 0.8 | 4.5 |
| Sub-portion number | 16→15 | 15→14 | 14→13 | 13→12 | 12→11 |
| Difference value of micro protrusion densities of adjacent sub-portions | 1.4 | 1.1 | 0.1 | 1.2 | 0.4 |
| Sub-portion number | 11→10 | 10→9 | 9→8 | 8→7 | 7→6 |
| Difference value of micro protrusion densities of adjacent sub-portions | 0.2 | 0.2 | 0.02 | 0.18 | 0 |

TABLE 4-continued

| Sub-portion number | 6→5 | 5→4 | 4→3 | 3→2 | 2→1 |
|---|---|---|---|---|---|
| Difference value of micro protrusion densities of adjacent sub-portions | 0 | 0 | 0 | 0 | 0 |

Tests show that the brightness of the first main portion 13a is still less than the brightness of the second main portion 13b, therefore, the brightness of the light emitting surface 11 overall is still not uniform.

By employing the light guide plate 10, the light rays from the light source device 20 can be reflected, refracted, and dispersed more times in the micro protrusions 130 in the sub-micro protrusions 131 of the first main portion 13a, therefore, the brightness of the first main portion 13a can be improved to be substantially equal to the brightness of the second main portion 13b, and the brightness of the light emitting surface 11 overall becomes uniform.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light guide plate, comprising:
a light incident surface;
a bottom plate;
a light emitting surface opposite to the bottom plate; and
a side surface opposite to the light incident surface;
wherein the light incident surface and the side plate are connected between the light emitting surface and the bottom surface, the bottom surface is imaginarily divided into a plurality of rectangular sub-portions, the sub-portions are continuously and uniformly distributed, the shapes and the areas of the sub-portions are the same as each other, a long side of each of the sub-portions is parallel to the light incident surface, each of the sub-portions uniformly distributes a plurality of micro protrusions, the shapes of the micro protrusions are the same as each other, a portion of the sub-portions close to the side surface constitutes a first main portion, the micro protrusion densities of the sub-portions in the first main portion gradually ascend along a direction from the light incident surface to the side surface; the difference values of the micro protrusion densities of any two adjacent sub-portions of the first main portion gradually ascend along the direction from the light incident surface to the side surface.

2. The light guide plate of claim 1, wherein the remainder of the sub-portions close to the light incident surface constitutes a second main portion, the micro protrusion densities of the sub-portions of the second main portion are less than that of the sub-portions of the first main portion.

3. The light guide plate of claim 2, wherein the micro protrusion densities of the sub-portions of the second main portion are the same as each other.

4. The light guide plate of claim 1, wherein the light incident surface is substantially perpendicular to the light emitting surface.

5. The light guide plate of claim 1, wherein each of the micro protrusions is semi-spherical, columnar, or rectangular.

6. A backlight module, comprising:
a light guide plate comprising:
   a light incident surface;
   a bottom plate;
   a light emitting surface opposite to the bottom plate; and
   a side surface opposite to the light incident surface;
   wherein the light incident surface and the side plate are connected between the light emitting surface and the bottom surface, the bottom surface is imaginarily divided into a plurality of rectangular sub-portions, the sub-portions are continuously and uniformly distributed, the shapes and the areas of the sub-portions are the same as each other, a long side of each of the sub-portions is parallel to the light incident surface, each of the sub-portions uniformly distributes a plurality of micro protrusions, the shapes of the micro protrusions are the same as each other, a portion of the sub-portions close to the side surface constitutes a first main portion, the micro protrusion densities of the sub-portions in the first main portion gradually ascend along a direction from the light incident surface to the side surface; the difference values of the micro protrusion densities of any two adjacent sub-portions of the first main portion gradually ascend along the direction from the light incident surface to the side surface; and
   a light source device facing the light incident surface.

7. The backlight module of claim 6, wherein the remainder of the sub-portions close to the light incident surface constitutes a second main portion, the micro protrusion densities of the sub-portions of the second main portion are less than that of the sub-portions of the first main portion.

8. The backlight module of claim 7, wherein the micro protrusion densities of the sub-portions of the second main portion are the same as each other.

9. The backlight module of claim 6, wherein the light incident surface is substantially perpendicular to the light emitting surface.

10. The backlight module of claim 6, wherein each of the micro protrusions is semi-spherical, columnar, or rectangular.

* * * * *